Patented June 21, 1949

2,473,931

UNITED STATES PATENT OFFICE 2,473,931

2- AND 4-SULFANILAMIDO QUINAZOLINE

Frank J. Wolf, Westfield, N. J., assignor to Merck & Co., Inc., Rahway, N. J., a corporation of New Jersey No Drawing. Application November 9, 1945, Serial No. 627,785

3 Claims. (Cl. 260—239.6)

This invention relates to certain therapeutically useful quinazoline derivatives and to procedures by which they may be prepared. More particularly it relates to certain therapeutically useful quinazoline derivatives substituted in either the 2 or 4 position by a sulfanilamido group, and to methods by which they may be produced.

I have found that certain quinazoline derivatives, more especially certain substituted quinazolines containing, as the substituent, a sulfanilamido group

in either the 2 or 4 position on the quinazoline ring, are therapeutically useful possessing therapeutic activity analogous to sulfapyrazine. I have found that they are useful and valuable additions to the sulfa drugs, and may be effectively used under circumstances where the sulfa drugs are ordinarily employed in combating human infections.

The new therapeutically active compounds may be generically represented by the formula:

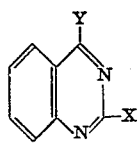

where X and Y represent hydrogen or sulfanilamido, the radicals being different in all cases.

Thus these compounds have the following structural formulae.

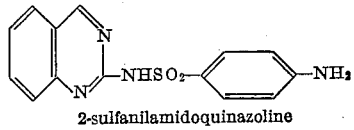

2-sulfanilamidoquinazoline and

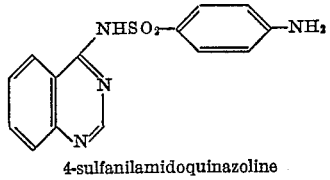

4-sulfanilamidoquinazoline

These new compounds may be readily prepared from available starting materials by two alternate processes. In one the corresponding 2- and 4-chloroquinazolines are first aminated, to replace chlorine by the amino (NH2) group. The formed 2, and 4, aminoquinazolines are reacted with p-acetyl-aminobenzene-sulfonylchloride, and the resulting compound treated to convert the acetamido group attached to the benzene nucleus to amino, thus forming the desired 2, and 4 substituted sulfanilamido-quinazolines. In the alternate procedure applicable especially to the preparation of 2-sulfanilamidoquinazoline, the 2-chloroquinazoline is reacted with sodium N-acetylsulfanilamide and the reaction product hydrolyzed to form the desired compound, the reaction being advantageously carried out in the presence of copper as a catalyst.

The reactions occurring, and the intermediate products, may be represented as follows:

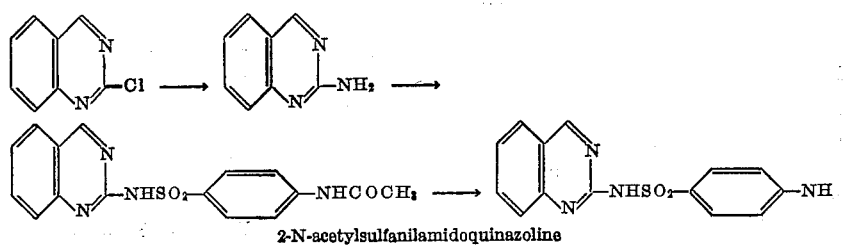

2-N-acetylsulfanilamidoquinazoline

Similarly, starting with 4-chloroquinazoline, the chemical changes occurring may be represented as follows:

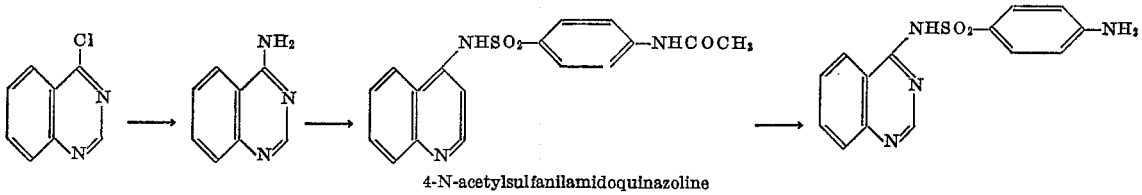
4-N-acetylsulfanilamidoquinazoline

The alternative method may be represented by the following:

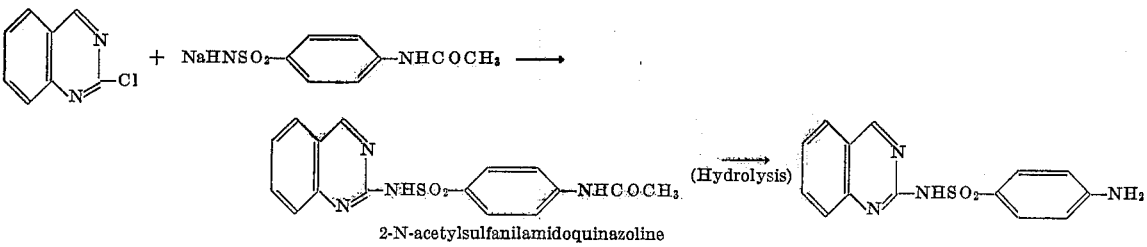
2-N-acetylsulfanilamidoquinazoline

The 2-sulfanilamido- and 4-sulfanilamidoquinazolines exhibit schizonticidal activity against malaria. When 2-sulfanilamidoquinazoline was tested for its curative action on chicks having malaria, definite although not very pronounced, schizonticidal activity was observed. 4-sulfanilamidoquinazoline when tested for its action on chicks having malaria showed excellent activity, its activity being about equal to that of the chemotherapeutic agent sulfadiazine. In treating these maladies, the compounds may be administered in the diet, and excellent therapeutic activity was observed when the compounds were given in a single dose every 48 hours, this therapeutic dose, however, being close to the toxic dose.

The new compounds and the procedures for preparing them are described in the following illustrative examples.

Example 1

18.0 grams of 2-chloroquinazoline, prepared as described in Berichte 29, 1313 (1896), was heated in a glass lined steel bomb with 400 milliliters of methanol containing 20% by volume of anhydrous ammonia. The heating was continued at 100° C. for 8 hours. The reaction mixture was evaporated to dryness, and the solid residue dissolved in 200 milliliters of 5% hydrochloric acid by warming. The acid solution was then treated with activated charcoal, and rendered alkaline by the addition of sodium hydroxide. This resulted in 15.0 grams (94.5% of the theoretical) of 2-aminoquinazoline having a melting point after one recrystallization from ethanol of 204–206° C. The composition was substantiated by carbon, hydrogen and nitrogen determinations.

A mixture of 1.53 grams of 2-aminoquinazoline, 6 milliliters of dried pyridine, and 2.62 grams of p-acetylaminobenzenesulfonylchloride was allowed to stand at room temperature ½ hour, then for four hours at 50° C. The reaction mixture was then added to 100 milliliters of water. The resulting mixture was cooled to 5° C. and filtered. In this way there was obtained 5.0 grams of a solid material, which was dissolved in 40 milliliters of 2.0% sodium hydroxide solution, treated with decolorizing carbon, and filtered. When the alkaline solution was acidified with acetic acid 4.9 grams (90% of the theoretical) of a reddish product melting at 235–240° C. was secured. This was 2-N-acetylsulfanilamidoquinazoline having the formula:

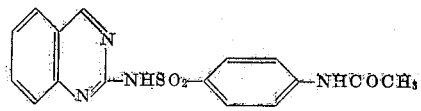

and the empirical formula $C_{16}H_{14}O_3N_4S$, which was verified by carbon, hydrogen, and nitrogen determinations.

The crude acetyl compound, above described, was hydrolyzed by boiling with 20 milliliters of 10% sodium hydroxide solution for one hour. The solution was treated with decolorizing carbon, filtered, and acidified with acetic acid. This yielded 1.5 grams (47.5% of theory) of a product which, when recrystallized by dissolving in 6 N ammonium hydroxide solution and boiling until the ammonia was expelled, yielded the desired product 2-sulfanilamidoquinazoline melting at 271–272° C. Its empirical formula, $C_{14}H_{12}O_2N_4S$, was established by carbon, hydrogen, and nitrogen determinations. The structural formula is as represented above.

Example 2

0.2 gram of 2-chloroquinazoline was reacted with 0.3 gram of sodium-N-acetylsulfanilamide in the presence of a trace of copper powder as the catalyst. The reaction was continued for 15 minutes at 200° C. The reaction mixture was then dissolved in aqueous sodium hydroxide solution, and reprecipitated by the addition of excess acetic acid. This resulted in a crude reddish product, which, when recrystallized from acetic acid, melted at 276–278° C. It was 2-N-acetylsulfanilamidoquinazoline having the empirical formula $C_{16}H_{14}O_3N_4S$. The constitution of the product was verified by means of carbon, hydrogen and nitrogen determinations.

This product was hydrolyzed by boiling with 20 milliliters of 10% sodium hydroxide solution for one hour. The solution was treated with decolorizing carbon, filtered, and acidified with acetic acid. The product resulting was further purified by dissolving it in 6 N ammonium hydroxide solution and boiling until the ammonia was expelled.

The resulting product, 2-sulfanilamidoquinazoline, was a crystalline material melting at 271–272° C. When this material was mixed with the material obtained from 2-aminoquinazoline no depression of melting point was observed.

*Example 3*

4-chloroquinazoline was utilized as the starting material. It was prepared by a modification of the method described at Berichte 29, page 1313 (1896).

This compound (obtained from 75 g. of 4-hydroxyquinazoline) was suspended in 500 milliliters of methanol into which there had previously been passed 60 grams of ammonia, and the mixture was heated in a glass-lined steel bomb at a temperature of 100° C. for 3 hours. The mixture was then concentrated to dryness, and the residue dissolved in hot 2% hydrochloric acid solution. The solution was then treated with decolorizing carbon, and precipitated with aqueous sodium hydroxide solution, thereby yielding 43 grams (37% of theory) of 4-aminoquinazoline. When recrystallized from isopropyl alcohol the 4-aminoquinazoline melted at 217° C., and had the empirical formula $C_8H_7N_3$ as established by carbon, hydrogen, and nitrogen determinations.

43.5 grams of 4-aminoquinazoline as prepared above were placed in 435 milliliters of dry pyridine at a temperature of 5° C. There was added thereto, with stirring, 73.5 grams of p-acetylaminobenzenesulfonyl chloride over a period of 40 minutes. During this time the reaction mixture was maintained in an ice bath. At the end of one hour the ice bath was removed, and the mixture allowed to stand at room temperature for an additional hour. It was then heated to 50° C. and maintained at that temperature for 2 hours. The solution was cooled, 500 milliliters of water and 30 grams of sodium bicarbonate added thereto, and then concentrated to a small volume under a pressure less than atmospheric.

The precipitated material was removed and purified by dissolving in 500 milliliters of water containing 15 grams of sodium hydroxide. This solution was then treated with decolorizing carbon and poured slowly, with vigorous stirring, into an excess of dilute acetic acid. This resulted in the precipitation of the 4-N-acetylsulfanilamidoquinazoline compound which was hydrolyzed to 4-sulfanilamidoquinazoline by boiling with 500 milliliters of 10% sodium hydroxide solution for 1½ hours.

The resulting solution was treated with decolorizing carbon, cooled, and poured slowly with vigorous stirring into an excess of dilute acetic acid. The yield of crude material was 35 grams (39% of theory), and the product had a melting point of 235° C. It was purified by treating with a solution of 32 milliliters of concentrated hydrochloric acid in 32 milliliters of absolute ethanol, and vigorously stirring the solution. The thick mixture was heated on the steam bath for a short time, cooled by an ice bath, filtered, and washed with alcohol. This resulted in the hydrochloride, which was suspended in water and treated with 1-normal solution of sodium hydroxide until the material dissolved. The resulting solution was again treated with decolorizing carbon and slowly added to an excess of dilute acetic acid, yielding 7.0 grams of a light tan-colored product melting at 255–256° C. The purification was again repeated and the final product was 6.3 grams of pure product melting at 260° C. It was 4-sulfanilamidoquinazoline having the empirical formula $C_{14}H_{12}O_2N_4S$, and its constitution was established by carbon, hydrogen, and nitrogen determinations.

The foregoing description and examples are intended to be illustrative only. Modifications therefrom, or variations therein, insofar as they conform to the spirit of my invention, are intended to be included within the scope of the appended claims.

I claim:

1. A therapeutically useful quinazoline derivative having the generic formula:

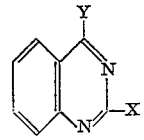

where X and Y are radicals different from each other, both being selected from the group which consists of hydrogen and sulfanilamido.

2. 2-sulfanilamido quinazoline.
3. 4-sulfanilamido quinazoline.

FRANK J. WOLF.

REFERENCES CITED

The following references are of record in the file of this patent:

UNITED STATES PATENTS

| Number | Name | Date |
| --- | --- | --- |
| 2,374,791 | Tillitson | May 1, 1945 |
| 2,407,966 | Sprague | Sept. 17, 1946 |
| 2,410,793 | Winnek et al. | Nov. 5, 1946 |

OTHER REFERENCES

Caldwell et al.: J. Am. Chem. Soc., vol. 63, pp. 2188–2189 (1941).

Dewar et al: J. Chem. Soc. (London), 1944, pp. 621–623.

Certificate of Correction

Patent No. 2,473,931 June 21, 1949

FRANK J. WOLF

It is hereby certified that errors appear in the printed specification of the above numbered patent requiring correction as follows:

Column 2, lower formula, extreme right-hand portion thereof for "—NH" read —$NH_2$; column 5, line 27, for "217° C." read *271° C.*;

and that the said Letters Patent should be read with these corrections therein that the same may conform to the record of the case in the Patent Office.

Signed and sealed this 13th day of December, A. D. 1949.

[SEAL]

THOMAS F. MURPHY,
*Assistant Commissioner of Patents.*